(12) United States Patent
Li et al.

(10) Patent No.: US 6,907,478 B2
(45) Date of Patent: Jun. 14, 2005

(54) SYSTEMS AND METHODS OPTIMIZING DATA TRANSFER THROUGHPUT OF A SYSTEM ON CHIP

(75) Inventors: Zhong-Hua Li, San Jose, CA (US); Chakradhara Raj Yadav Aradhyula, Santa Clara, CA (US); Srikanthan Tirumala, Fremont, CA (US); Prasad Kuncham, Sunnyvale, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 10/369,977

(22) Filed: Feb. 18, 2003

(65) Prior Publication Data

US 2004/0177176 A1 Sep. 9, 2004

(51) Int. Cl.⁷ .............................................. G06F 13/14
(52) U.S. Cl. ............................ 710/33; 710/34; 710/35; 709/208; 709/213; 709/238
(58) Field of Search .............................. 710/33, 34, 35, 710/60, 61, 110; 709/208, 213, 238

(56) References Cited

U.S. PATENT DOCUMENTS

| | | | | |
|---|---|---|---|---|
| 5,023,829 A | * | 6/1991 | Shibata ........................ | 710/33 |
| 5,412,592 A | * | 5/1995 | Krishnamoorthy et al. ... | 365/49 |
| 5,416,907 A | * | 5/1995 | Polzin et al. ................. | 710/66 |
| 5,590,369 A | * | 12/1996 | Burgess et al. ............. | 710/110 |
| 5,657,223 A | * | 8/1997 | Juszczak et al. ............ | 705/400 |
| 5,805,821 A | * | 9/1998 | Saxena et al. .............. | 709/231 |
| 5,983,289 A | * | 11/1999 | Ishikawa et al. ............. | 710/35 |
| 6,237,072 B1 | * | 5/2001 | Houlsdworth ............... | 711/171 |
| 6,349,348 B1 | * | 2/2002 | Nishio et al. ................ | 710/34 |

* cited by examiner

Primary Examiner—Rehana Perveen
(74) Attorney, Agent, or Firm—IP Strategy Group PC

(57) ABSTRACT

A method for facilitating transfer of data between a master block and a slave block through a bus. The method includes ascertaining a transfer size of the data. The method also includes designating a first possible transfer size in a set of possible transfer sizes a chosen transfer size, the set of possible transfer sizes including possible transfer sizes ranging from $2^0$ to $2^n$, where $2^n$ at least equals to the largest transfer size desired between the master block and the slave block, the first possible transfer size presenting the largest possible transfer size in the set of possible transfer sizes that is less than or equal to the transfer size. The method additionally includes transferring a first data portion of the data from the master block to the slave block, the first data portion having a size that is equal to the chosen transfer size. The method also includes setting the transfer size to be equal to the transfer size less the chosen transfer size and repeating said designating and transferring said first data portion if the chosen transfer size is less than the transfer size.

13 Claims, 9 Drawing Sheets

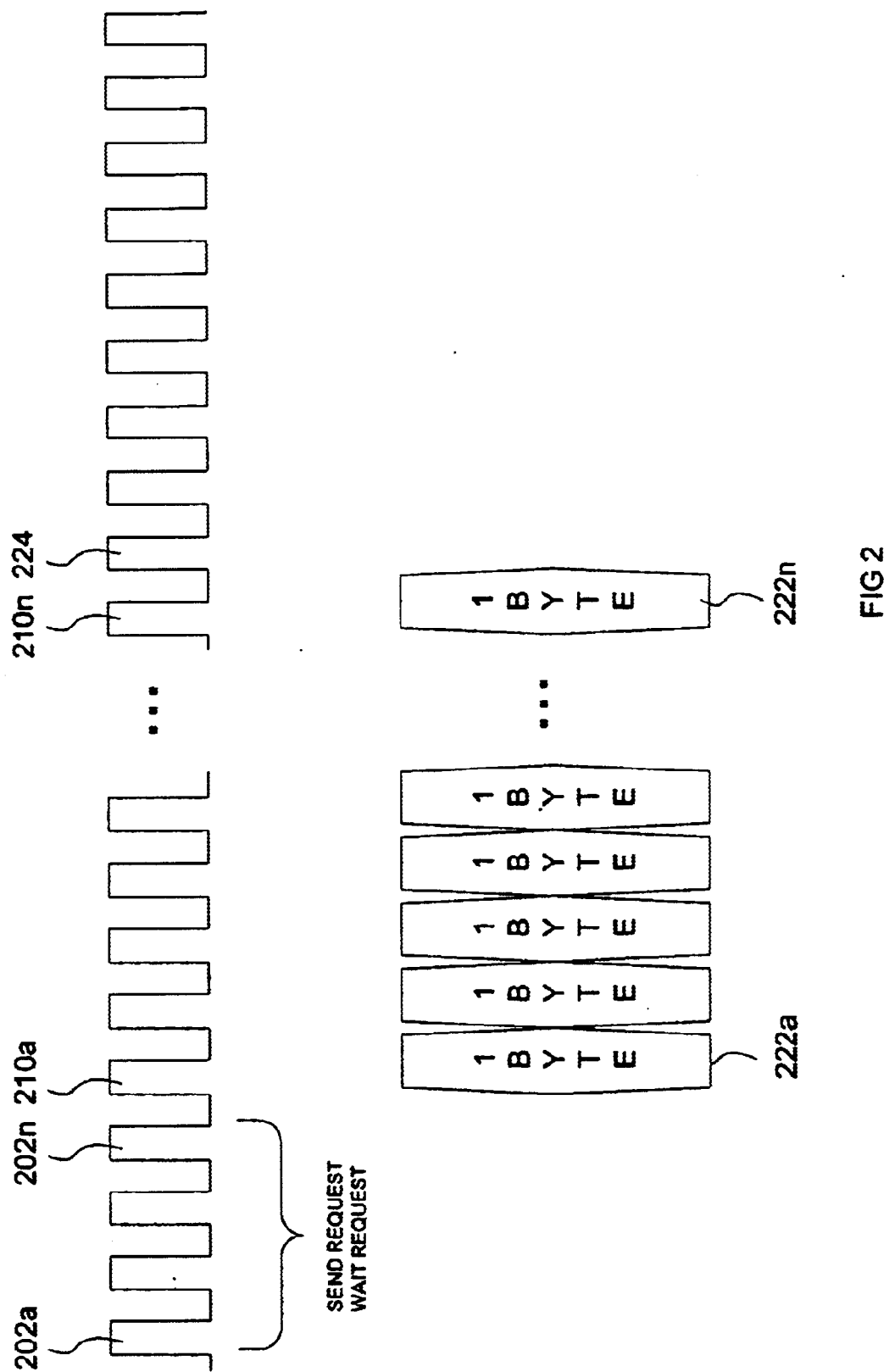

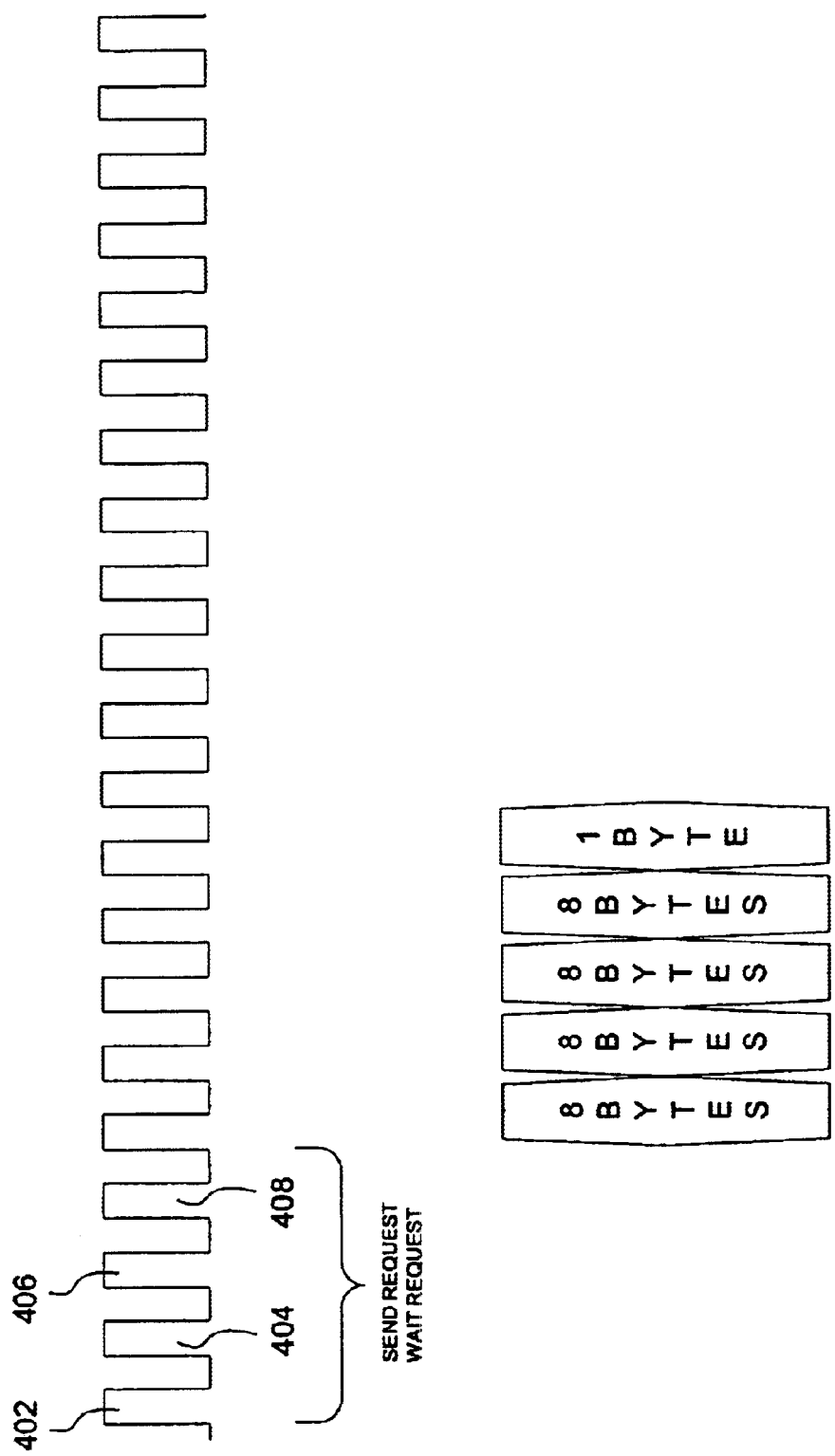

| TOTAL TRANSFER SIZE (BYTES) | HBURST # OF BURSTS | HSIZE SIZE OF EACH BURST (BYTES) |
| --- | --- | --- |
| 1 | 1 | 1 |
| 2 | 1 | 2 |
| 4 | 1 | 4 |
|   | 4 | 1 |
| 8 | 1 | 8 |
|   | 4 | 2 |
|   | 8 | 1 |
| 16 | 4 | 4 |
|   | 8 | 2 |
|   | 16 | 1 |
| 32 | 4 | 8 |
|   | 8 | 4 |
|   | 16 | 2 |
| 64 | 8 | 8 |
|   | 16 | 4 |
| 128 | 16 | 8 |

FIG. 5

SYSTEMS AND METHODS OPTIMIZING DATA TRANSFER THROUGHPUT OF A SYSTEM ON CHIP

BACKGROUND OF THE INVENTION

The present invention relates in general to semi-conductor technologies and in particular to embedded semi-conductor architectures, such as Systems-On-Chip (SOC) designs.

The continued growth of the Internet, communications technologies, pervasive computing, and consumer electronics, has fueled the need for high-performance low-cost components. Among the most pervasive of these components are SOCs, which are in nearly everything electronic in the world today. SOCs combine fixed and programmable intellectual property Cores with custom logic and memory, connected through a bus, on a single piece of silicon, thereby greatly reducing its overall cost.

ARM-based microprocessor cores, available from ARM Holdings, have become very popular for use in SOC designs because of power efficiency and high performance characteristics. The leading bus architecture for ARM-based SOCs is AMBA (Advanced Microcontroller Bus Architecture). AMBA defines an open, on-chip bus standard for designing high performance embedded microcontrollers.

The AMBA specification, however, only specifies general requirements for the interconnection and management of functional blocks that are necessary for interfacing with a high performance microcontroller, such as an ARM microprocessor core. The specification leaves the detailed implementation open. Per the specification, four basic functional blocks construct a basic AMBA system: master, slave, decoder, and arbiter. Master and slave blocks can be further coupled to external hardware applications, such as a direct memory access (DMA) microcontroller or a digital signal processor (DSP). Each external hardware application, in turn, is controlled by an operating system through a software application called a driver. A specific driver is normally designed for a particular hardware application.

A data transfer across the AMBA bus, per the specification, can only be initiated by master block. More specifically, the driver places address and control information, such as the transfer length in terms of bytes, into specific control registers within the master block. The master block then requests an AMBA bus grant from the arbiter block. Once the grant is given, the data is transferred. The slave block signals back to master block the success, failure or waiting of the data transfer. The decoder block decodes the address and determines the target slave block for the current master.

The arbiter block ensures that only one master block at a time is allowed to initiate a data transfer. The arbiter block normally uses some fixed selection algorithm, such as priority or round-robin replacement, to determine the next master block that will be given access to the AMBA bus. The master block must also tell the arbiter block the total size of each transfer, since the arbiter block may also decide to pre-empt a multi-cycle transfer at any time.

FIG. 1A illustrates a functional diagram 100 of a generic ARM SOC implementation. Hardware applications, external to the ARM core, are coupled to the set of master and slave functional blocks generically called application blocks #1–#N 106–108, where N is a whole number greater than one. These application blocks are, in turn, coupled to an AMBA bus 104, which provides the means for transferring the data. An ARM microprocessor core 102 is coupled to the AMBA bus 104, and provides the core computational engine for the ARM SOC.

For instance, application block #1 106 wishing to transmit data to application block #N 108, would request control of the AMBA bus 104, transmit the data once control was given, and then yield control of the AMBA bus 104 to another application block once the data was transmitted.

Referring now to FIG. 1B, there is shown a detailed conceptual diagram of an ARM SOC implementation 150. The application blocks 106–108 previously shown in FIG. 1A are now further classified into a set of master blocks 154–156, and a set of slave blocks 160–162 which are coupled to AMBA bus 158. The ARM SOC implementation further includes an arbiter block 152, an ARM microprocessor core 102, a set of master applications 168–172, and a set of slave applications 164–166.

The arbiter block 152 is coupled to the AMBA bus 158, and ensures that only one master block 154–156 at a time is allowed to initiate a data transfer between a master block 154–156 and a slave block 160–162. Likewise, the ARM microprocessor core 102 is coupled to the AMBA bus 158, and provides the core computational engine for the ARM SOC. The set of master applications 168–172 is directly coupled to the set of master blocks 154–156. For instance, master application #1 168 is directly coupled to master block 154, etc. Likewise, a set of slave applications 164–166 is directly coupled to the set of slave blocks 160–62. For instance, slave application #1 164 is directly coupled to slave block #1 160, etc.

For example, a master application #1 168, such as a digital signal processor (DSP), desires to read data located in a slave application #1 164, such as RAM computer memory. The software driver for master application #1 168 places address and control information for the data it wants into specific control registers of master block #1 154. Master block #1 154, in turn communicates this information to the AMBA bus arbiter 152 and requests a grant to the AMBA bus 158. Using some fixed selection algorithm, such as priority or round-robin replacement, the arbiter block 152 selects then grants control of AMBA bus 158 to master block #1 154. Master block #1 154 then sends a read request to slave block #1 160, which, in turn, transmits the request to slave application #1 164. The software driver for slave application #1 164 locates the data and transfers the requested data through slave interface #1 160 to master interface #1 154, and then finally to master application #1 168. If additional data needs to be transferred, access to the AMBA bus 158 is re-requested from the arbiter block 152, and the process is repeated, until all the data is transferred.

The overall performance of the SOC, as measured by data transfer throughput between its blocks, is directly related to the efficiency the AMBA implementation, and more specifically, the manner in which the data transfer scheduling is designed and implemented. The AMBA specification defines two parameters for controlling a burst data transfer: burst beat (HBURST) and burst size (HSIZE). A beat is the amount of data transferred in a single clock cycle. HBURST specifies the number of beats for each transfer, for example, one, four, eight, or sixteen beats. HSIZE specifies the size of each beat. Depending on maximum bus width, the maximum HSIZE can be single byte (8 bits), a half-word (2 bytes or 16 bits), a word (4 bytes or 32 bits), a double-word (8 bytes or 64 bits), or greater. For any given bus width, the transfer can utilize any burst size that is equal to or less than the bus width.

In an exemplary AMBA implementation, the HBURST and HSIZE parameters are permanently fixed in hardware.

For example, in a fixed parameter AMBA implementation with HSIZE equal to 8 bytes, a transfer of 33 bytes of data would also require the transfer of 7 additional bytes of non-related, or garbage, data. That is, while the first 32 data bytes could be transferred in 4 beats, the last beat would need to contain both the final data byte along with 7 additional garbage bytes.

In the case of a data read, the garbage bytes can simply be ignored. In the case of a data write, however, garbage bytes may overwrite legitimate data already in memory. Since unintentionally overwriting data could potentially be catastrophic to any application which uses the data, a SOC that uses a fixed parameter AMBA implementation must therefore restrict all data transfers to the minimum, or HSIZE=1 byte. For example, a transfer of 33 bytes data will require 33 transfers, each transfer consuming a separate clock cycle, or 33 total clock cycles.

Referring now to FIG. 2, there is shown a simplified diagram of a fixed parameter AMBA implementation with a HSIZE equal to 8 bytes, in which 33 bytes are transferred from a master block to a slave block. A clock cycle is defined from rising-edge to rising-edge transitions. Since a beat is 1 byte in this example, 33 total beats will be needed to transfer a 33-byte data block. Initially, the master block consumes 4 cycles 202 in sending the grant request to the arbiter block and in waiting for a response, which is received at cycle 202n. Bytes 222 are then sequentially transmitted, beginning at cycle 210a and ending 33 cycles later at cycle 210n. The AMBA bus is then yielded in cycle 224 to another master block.

In an another exemplary AMBA implementation, a software application such as a device driver is allowed to programmatically determine the optimum HBURST and HSIZE values Referring now to FIG. 3A, there is shown a simplified clock cycle timing diagram for the programmatic technique of a data transfer of 33 bytes across the AMBA bus of width 8 bytes, from a master block to a slave block. The application uses an initial period 364 to place the address and control information for the first transfer into specific registers within the master block. This first transfer will be a burst 382–390 of four 8-byte beats. The first 8 bytes 382 are then transmitted during cycle 360. The second 8 bytes 384 are transmitted during cycle 354. The third 8 bytes 388 are transmitted during cycle 364. The fourth 8 bytes 390 are transmitted during cycle 358. The driver then uses a period 387 to place address and control information for the next transfer of 1 byte 389 into the registers within the master block. The final burst 389 is transferred during cycle 378. If successive bursts comprise single beats of differing sizes, the amount of time to calculate and update registers would significantly exceed the actual time in transferring the data.

Referring now to FIG. 3B, there is shown a simplified process by which a software application programmatically initiates a data transfer across the AMBA bus. An optimum beat size is first calculated at step 391 (calculate optimum beat). Address and control information for this beat is then placed into specific registers of the master block a step 393 (place address & control information into master block registers). The master block then requests a grant from the arbiter block at step 395 (request grant), and waits for a response at step 396 (wait for grant). Upon receipt of the grant, the transfer is initiated at step 397 (initiate transfer). If the transfer is not complete at step 398 (is transfer complete?), a next optimum beat size is calculated at step 391 (calculate optimum beat), and the process is repeated until all the data is transferred, at which the process ends at step 399.

Both the fixed parameter and the programmatic implementations can substantially increase data transfer latency across the AMBA bus. Fixed parameter implementations can require an excessive amount of bursts for each transfer, as shown in FIG. 2. While programmatic implementations may require relatively large amounts of cycles to calculate and update the proper control registers, as shown in FIG. 3A.

It is felt that additional improvements can be made to the AMBA implementation to improve the overall data transfer throughput of a SOC.

SUMMARY OF THE INVENTION

The invention relates, in one embodiment, to a method for facilitating transfer of data between a master block and a slave block through a bus. The method includes ascertaining a transfer size of the data. The method also includes designating a first possible transfer size in a set of possible transfer sizes a chosen transfer size, the set of possible transfer sizes including possible transfer sizes ranging from $2^0$ to $2^n$, where $2^n$ at least equals to the largest transfer size desired between the master block and the slave block, the first possible transfer size presenting the largest possible transfer size in the set of possible transfer sizes that is less than or equal to the transfer size. The method additionally includes transferring a first data portion of the data from the master block to the slave block, the first data portion having a size that is equal to the chosen transfer size. The method also includes setting the transfer size to be equal to the transfer size less the chosen transfer size and repeating said designating and transferring said first data portion if the chosen transfer size is less than the transfer size.

In another embodiment, the invention relates to an apparatus for ascertaining a chosen transfer size for facilitating data transfer of data between a master block and slave block through a computer bus. The apparatus includes a plurality of multiplexers disposed as nodes in a binary tree arrangement, leaf nodes of the binary multiplexer tree being configured to receive as inputs possible transfer sizes ranging from $2^0$ to $2^n$, where $2^n$ at least equals to the largest transfer size desired between the master block and the slave block, a root node of the binary multiplexer tree being configured to output the chosen transfer size, a leaf node of the leaf nodes being configured to receive two consecutive ones of the possible transfer sizes and configured to compare a value received at its control terminal against a larger one of the two consecutive ones, the leaf node being configured to output the larger one of the two consecutive ones if the value received is at least equal to the larger one of the two consecutive ones, the leaf node being configured to output a smaller one of the two consecutive ones if the value received is less then the larger one of the two consecutive ones, wherein the value is received at control terminals at each of the plurality of multiplexers, the value representing a size of the data.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts a prior-art timing diagram of a fixed parameter AMBA implementation;

FIG. 4 depicts, in accordance with one embodiment of the present invention, the timing diagram of an AMBA SOC wherein functional control logic within the master block determines the optimum burst;

FIG. 5 depicts, in accordance with one embodiment of the present invention, a simplified chart describing various combinations of HBURST and HSIZE for an exemplary system having a maximum bus size of 64 bits (8 bytes or double words);

DETAILED DESCRIPTION OF THE PREFERRED EMBODIMENTS

Figure 1A:
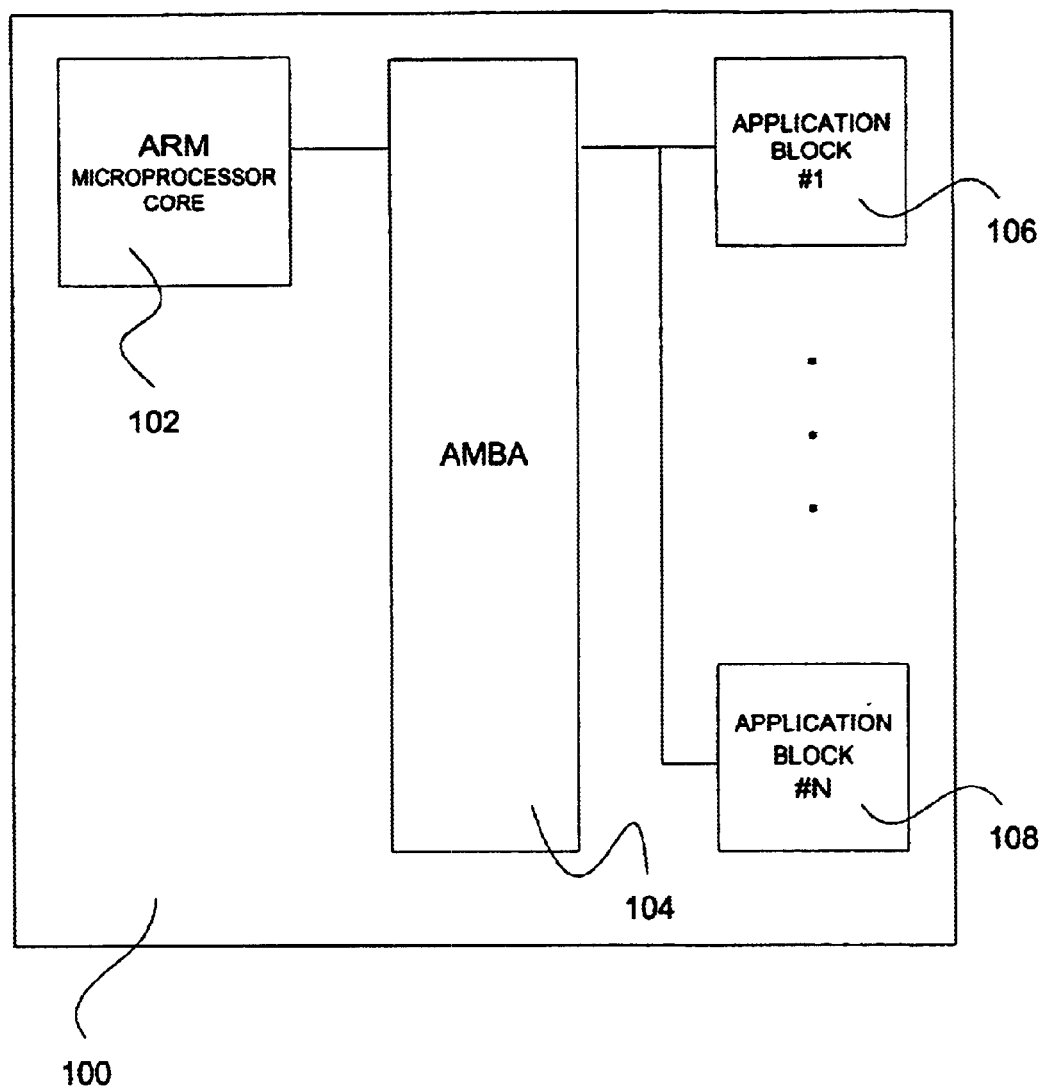
FIG. 1A depicts a high-level diagram of an ARM SOC.
Figure 1B:
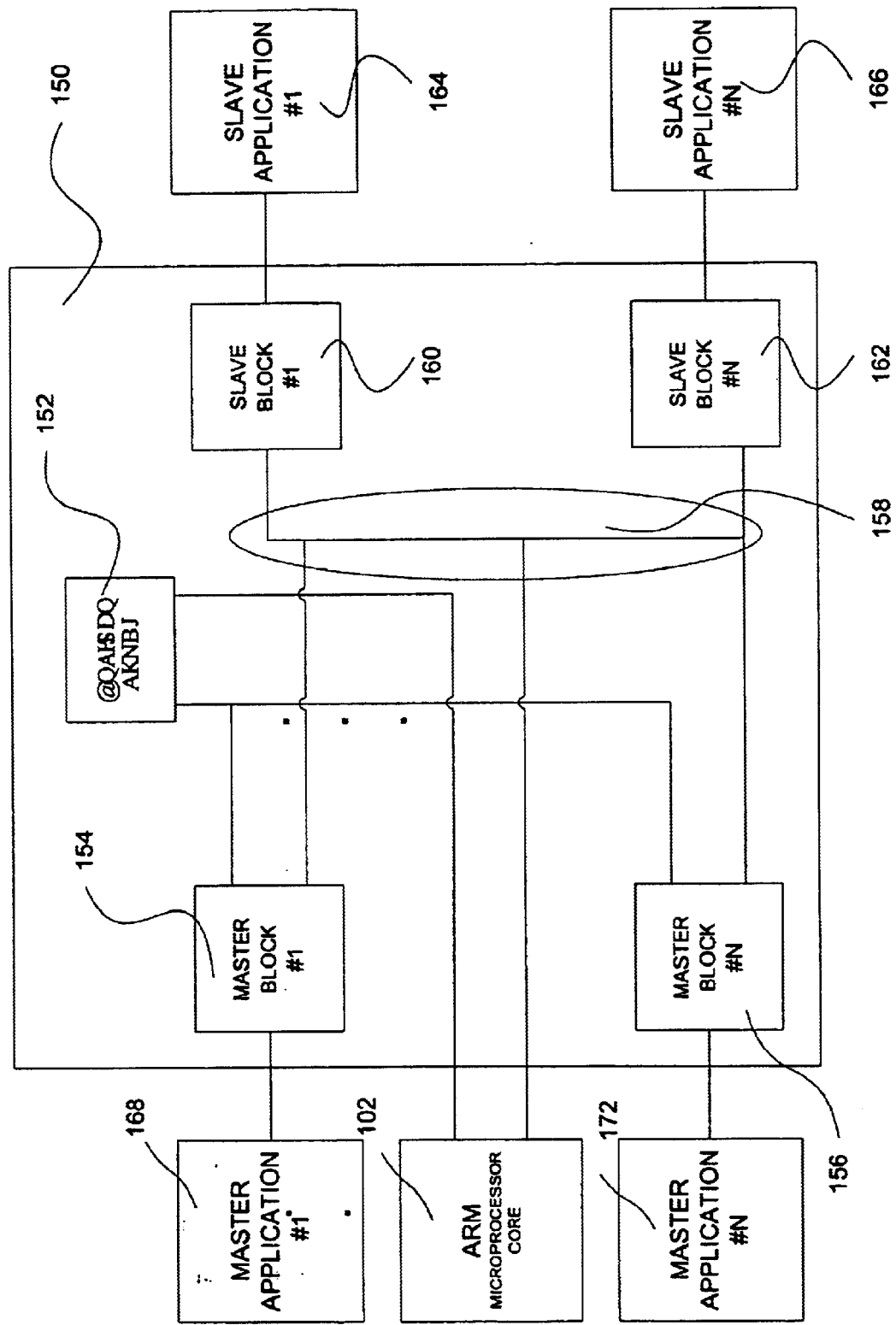
FIG. 1B shows a conceptual diagram of an ARM SOC.
Figure 3A:
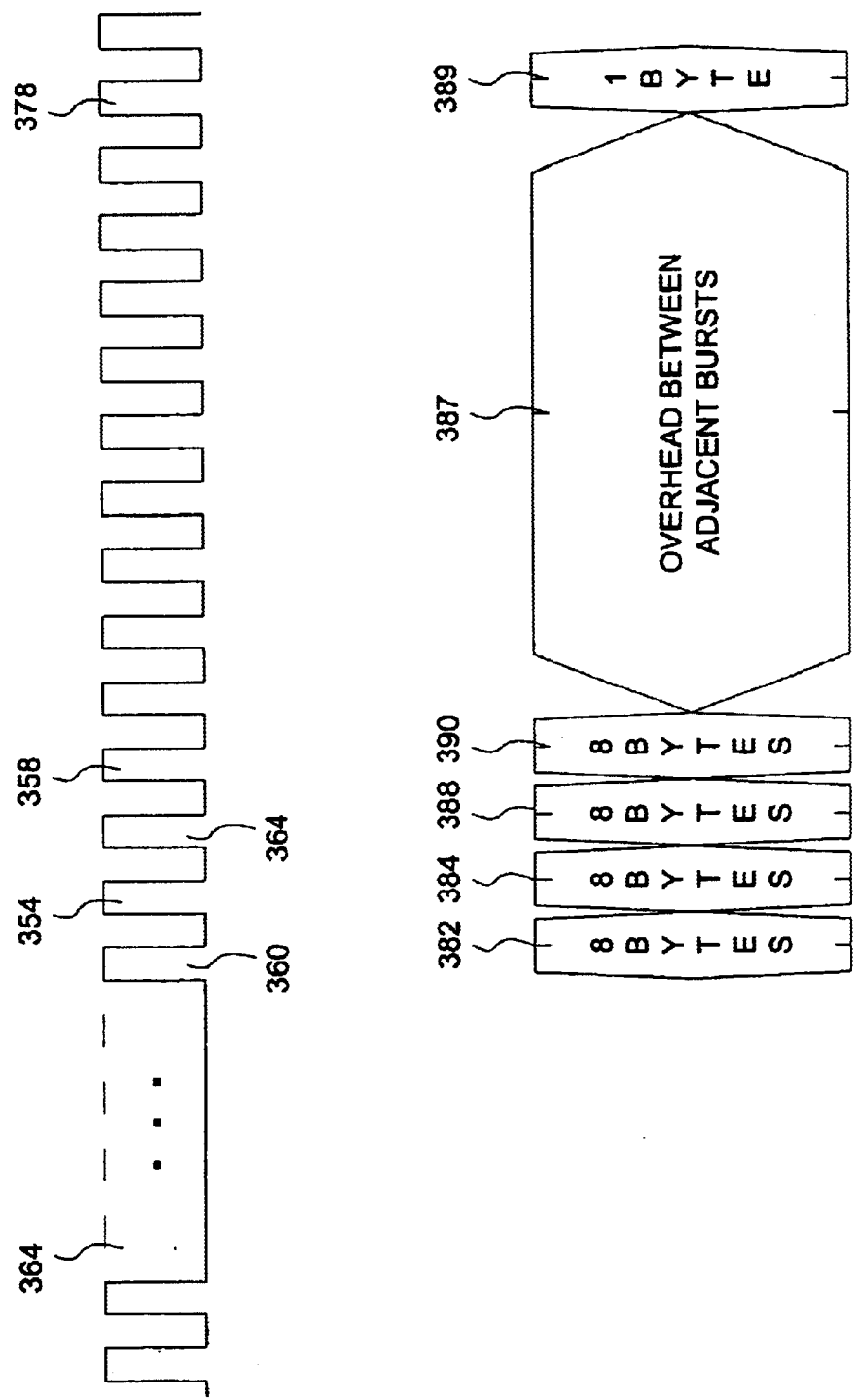
FIG. 3A depicts simplified clock cycle timing diagram for the programmatic transfer of data across the AMBA bus.
Figure 3B:
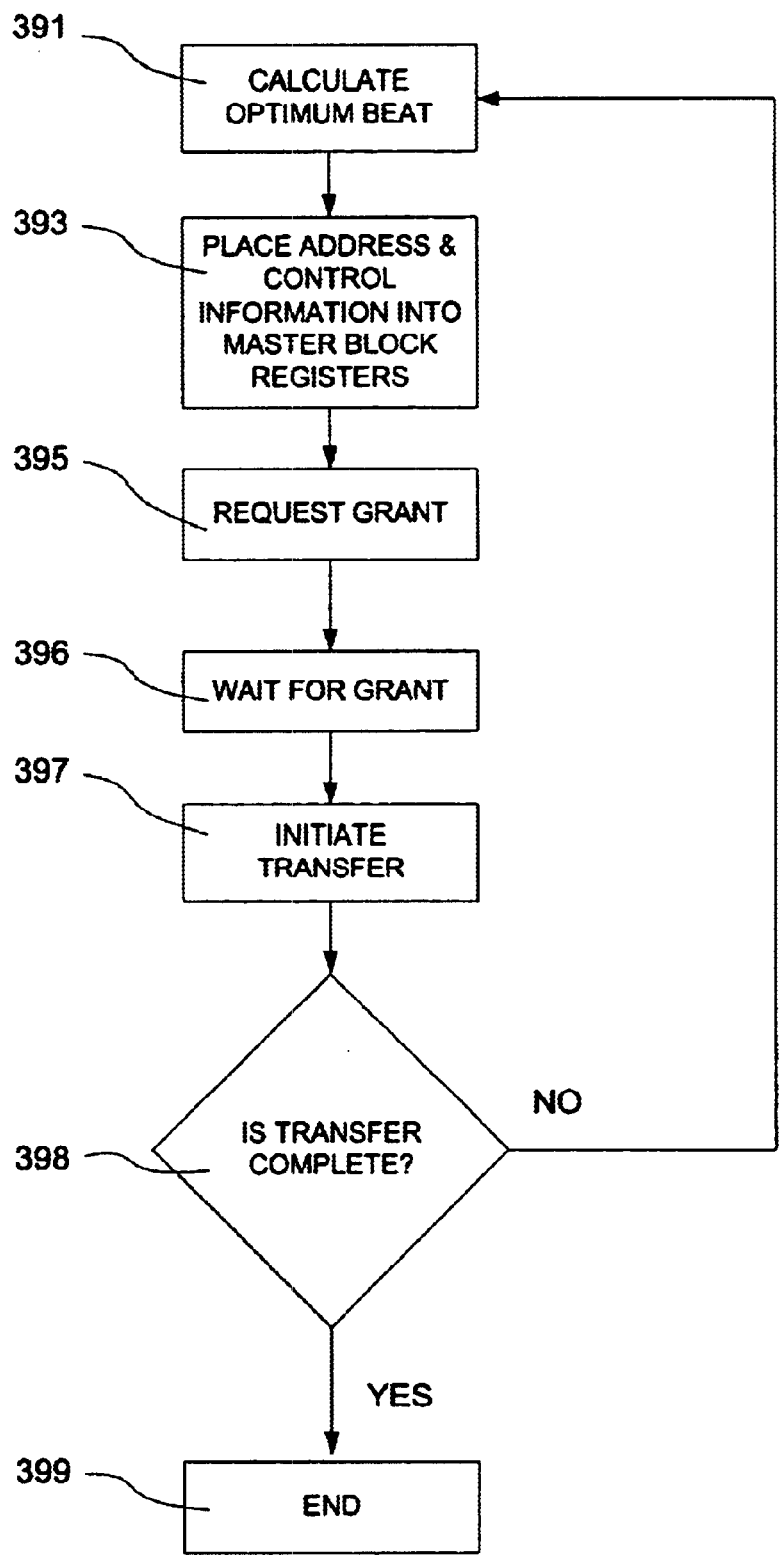
FIG. 3B depicts a prior-art flowchart of the programmatic transfer of data across the AMBA bus.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, a bisection optimization technique is advantageously employed with a state machine to optimize the transfer of data between a master block and a slave block, across the AMBA bus of a SOC. In one embodiment, each master block contains functional control logic that determines the optimum values for the transfer size, and the size of HBURST and HSIZE for each transfer until all data associated with the request is transferred.

Referring now to FIG. 4 there is shown for the present invention a clock cycle timing diagram for data transfer of 33 bytes across the AMBA bus of width 8 bytes, from a master block to a slave block. During an initial period 402–408, the driver places the address and control information into specific registers within the master block. The master block then requests a grant from the arbiter block and waits for a response. Once the master block is granted control of the AMBA bus, no more interaction with the AMBA bus arbiter is needed until the transfer has been completed, unless the transfer is prematurely interrupted by the arbiter block.

Referring now to FIG. 5, there is shown a simplified chart describing various combinations of HBURST and HSIZE for an exemplary system having a maximum bus size of 64 bits (8 bytes or double words). In the example of FIG. 5, there are 16 possible combinations. Of course if the bus size changes, different possible combinations exist yet the technique still applies.

Note that in the example of FIG. 5, there are actually only 8 different transfer sizes ($2^0$ to $2^N$ bytes, with $2^N$ representing the largest desired transfer size for the data transferred between the master and the slave blocks). Thus, the problem can be simplified to choosing the optimum transfer size, and subsequently the optimum combination of HBURST and HSIZE for the optimum transfer size chosen.

In one embodiment, if the number of bytes to be transferred equals to one of the possible transfer sizes (e.g., 1 byte, 2 bytes, 4 bytes, 16 bytes, 32 bytes, 64 bytes, and 128 bytes), that transfer size is chosen to be the optimum transfer size and the method proceeds to finding the optimum combination of HBURST and HSIZE. In choosing the optimum combination of HBURST and HSIZE, the rule is to choose the combination that has the fewest number of HBURST for that transfer size.

Consider the following example. Suppose that 32 bytes needs to be transferred. Since 32 bytes equals one of the possible transfer sizes, the optimum transfer size is 32 bytes. With reference to Table 5, 32 bytes can be transferred by three different combinations of HBURST and HSIZES: 4×8 bytes, 8×4 bytes, or 16×2 bytes. Since 4×8 bytes is the combination that has the fewest number of HBURST, the transfer will be done with HBURST=4 and HSIZE=8.

If the size of the data to be transferred is not one of the possible transfer sizes (e.g., 1 byte, 2 bytes, 4 bytes, 16 bytes, 32 bytes, 64 bytes, or 128 bytes), the data transfer is performed with multiple transfers, with each transfer employing the largest transfer size possible that is less than or equal to the remaining number of bytes to be transferred. The method can best be explained with an example.

Suppose one wish to transfer 36 bytes. Since 36 bytes is not one of the transfer size combinations in FIG. 5, the data transfer need to be performed with multiple transfers. The largest transfer size possible that is less than 36 bytes is 32 bytes, with 4 bytes remaining. Thus the first transfer will involve 32 bytes. Applying the above-mentioned rule of employing the combination that has the fewest number of HBURST for a 32-byte transfer, it can be seen from FIG. 5 that the initial transfer will be done with HBURST=4 and HSIZE=8.

The remaining 4 bytes will be transferred with the largest transfer size possible that is less than or equal to the remaining number of bytes. With reference to FIG. 5, a transfer size of 4 bytes equals the remaining number of bytes, with 0 bytes remaining. Thus the second transfer will involve 4 bytes. Applying the above-mentioned rule of employing the combination that has the fewest number of HBURST for a 4-byte transfer, it can be seen from FIG. 5 that the transfer will be done with HBURST=1 and HSIZE=4.

In one embodiment, the optimum transfer size for each transfer is chosen by a bisection optimization method. Again, the bisection method can be best explained with reference to an example. Take the example of the 36-byte transfer (X=36). Given the maximum bus size of 64 of the present example and with reference to Table 5, first compare X with the middle point of the set of 8 transfer sizes from 1-byte to 128 bytes. In a set having an even number of transfer sizes, however, the middle point falls in between two transfer sizes, i.e., in between the transfer size of 8 bytes and the transfer size of 16 bytes in the present example. In accordance with one aspect of the present invention, if the set has an even number of transfer sizes, the next larger transfer size from the actual middle point is employed as the middle point for comparison purpose (i.e., the fifth transfer size of 16 bytes in the above set of 8 transfer sizes).

Since X is not less than or equal to 16 bytes, the set of transfer sizes less than 16 bytes is discarded and the solution is searched among the remaining transfer sizes, i.e., the set of transfer sizes that includes four members: 16 bytes, 32 bytes, 64 bytes, and 128 bytes. X is then compared with the middle point of this remaining set. Since the remaining set has an even number of members, the middle point is chosen to be the next larger transfer size from the actual middle point, or 64 bytes. Since X is less than or equal to 64 bytes, the set of transfer sizes larger than the new middle point of 64 bytes is discarded, the solution is searched among the remaining transfer sizes i.e., the set of transfer sizes that includes three members: 16 bytes, 32 bytes, and 64 bytes.

Since this remaining set has an odd number of members, the actual middle point of 32 bytes is employed for comparison purpose. Since X is not less than or equal to 32 bytes, the set of transfer sizes less than 32 bytes is discarded and the solution is searched among the remaining transfer sizes, i.e., the set of transfer sizes that includes 2 members: 32 bytes and 64 bytes.

In one embodiment, if there are only two transfer sizes remaining, the smaller transfer size is chosen to be the optimal transfer size. This is because X is between these two transfer sizes and only the smaller transfer size can satisfy the rule that the transfer be done with a transfer size that is less than or equal to the size of the remaining data to be transferred. Thus, with 36 bytes remaining to be transferred, only the transfer size of 32 would satisfy the rule and be chosen as the optimum transfer size for the first transfer. Four bytes remain.

In the second transfer, the bisection optimization method is applied again, and the optimum transfer size is quickly determined to be 4 bytes. Applying the aforementioned rule for selecting the HBURST and HSIZE for the transfers, the first transfer will involve an HBURST of 4 and an HSIZE of 8, and the second transfer will involve an HBURST of 1 and an HSIZE of 4.

The bisection optimization algorithm can be applied to any arbitrary data transfer sizes from any application and/or agent for any bus size. In a preferred embodiment, the algorithm is implemented in hardware using a binary multiplexer tree structure to minimize the time required to search for the combination of optimum transfer size and optimum set of (HBURST, HSIZE) for each transfer.

Figure 6:
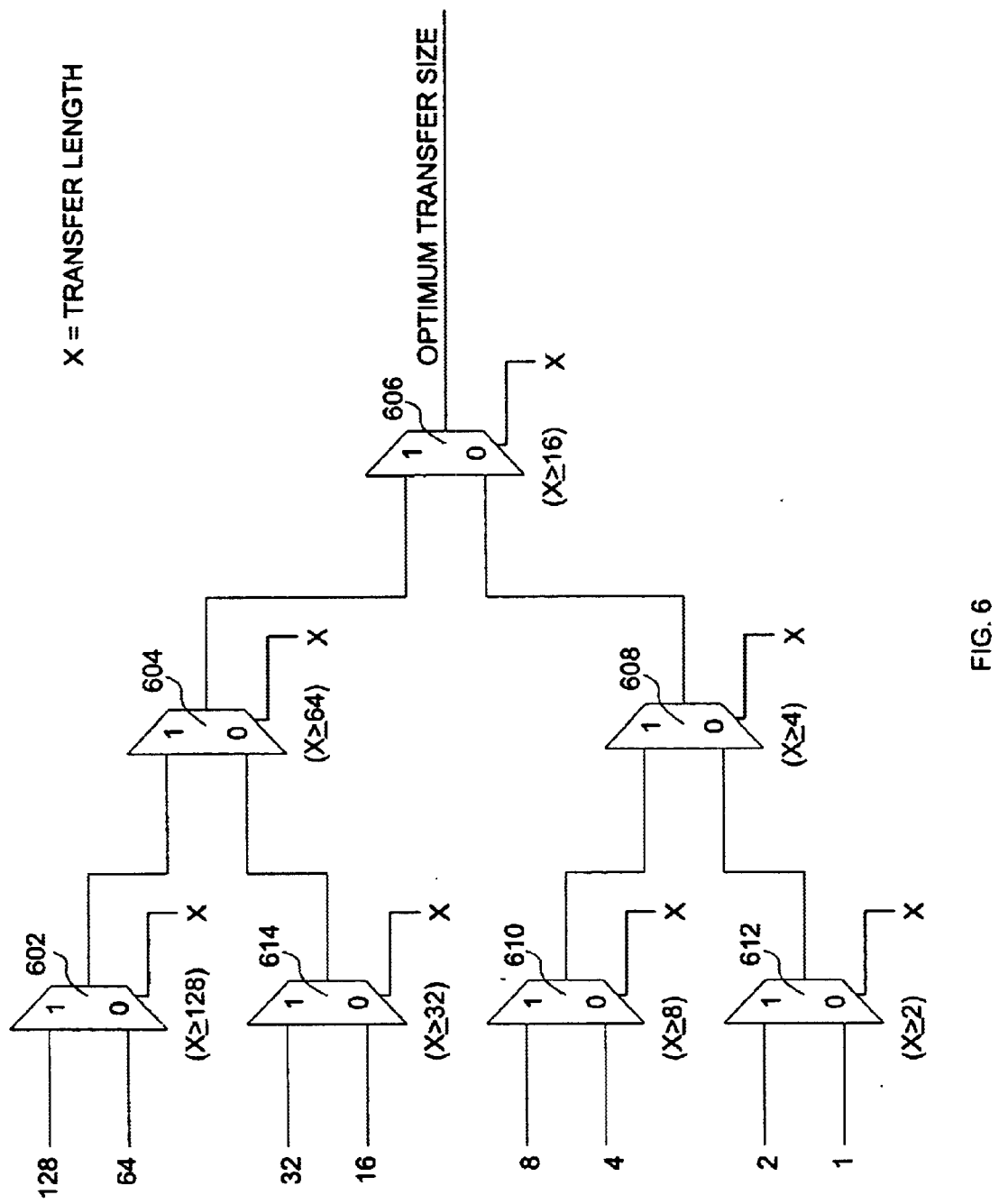
FIG. 6 depicts, in accordance with one embodiment of the present invention, a functional diagram of a binary multiplexer tree implemented in the master device for selecting the optimum transfer size during each transfer.
Figure 7:
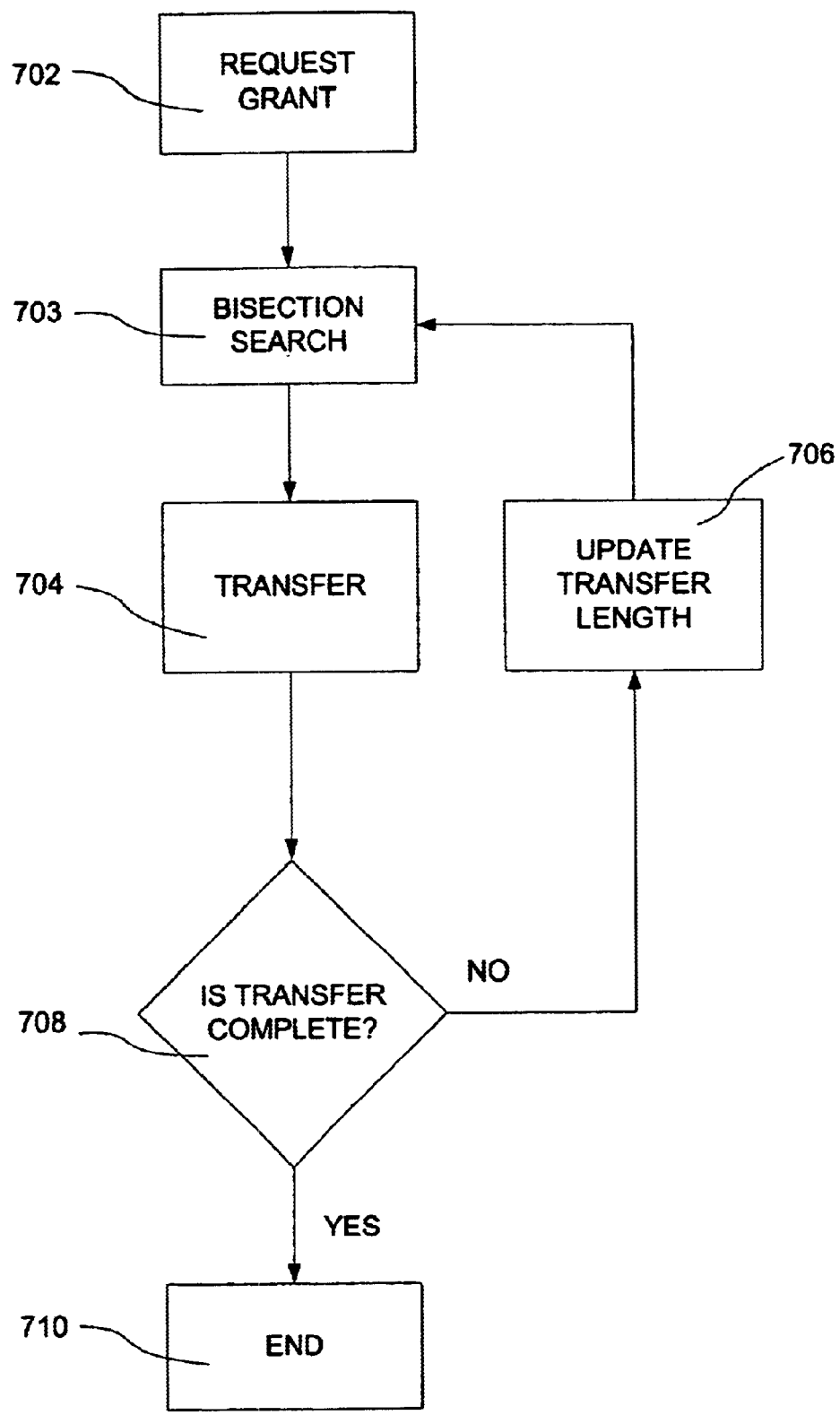

Referring now to FIG. 6, there is shown in one embodiment of the present invention a functional diagram of a binary multiplexer tree implemented in the master device for selecting the optimum transfer size during each transfer. In the binary multiplexer tree of FIG. 6, selections propagate through multiplexer disposed at different levels of the tree. Each multiplexer is controlled by a control signal, which toggles true or false depending on the comparison result between the remaining data to be transferred (X) and a predefined comparison value associated with each multiplexer. Since the comparisons are made simultaneously at all multiplexers, the state of control signals at the multiplexers of the tree are determined simultaneously, and the selections through the multiplexers of the tree can be completed very quickly.

The tree outputs the optimum transfer size for that transfer, and the remaining data to be transferred, if any, may be compared again using the binary multiplexer tree to ascertain the optimum transfer size for the next transfer. The process continues until all data associated with the transfer requested is transferred.

The master block further contains a state machine that controls the data transfer flow, and a transfer count parameter that maintains the amount of data remaining in the current transfer. For each transfer, the master block functional control logic also determines the optimal combination of HBURST and HSIZE based on the optimum transfer size ascertained via the binary multiplexer tree and the aforementioned rule of choosing the combination of HBURST and HSIZE that involves the fewest bursts. When the transfer count is 0, the transfer is complete.

As can be seen in FIG. 6, the binary multiplexer tree is conceptually designed as a plurality of multiplexers coupled together in a tree-like structure. Viewed from the root node/multiplexer, each node/multiplexer of the tree has exactly two children. Individual possible transfer values (e.g., 1, 2, 4, 8, 16, 32, 64, and 128 in the present example) are paired up starting with the first pair (1 and 2) serving as inputs into the first multiplexer 612. The next pair (4 and 8) serve as inputs into the multiplexer 610, the next pair after that (16 and 32) serve as inputs into the multiplexer 614, and the next pair after that (64 and 128) serve as inputs into the multiplexer 602.

At the next level, pairs of multiplexers are paired up, starting with the first pair of multiplexers 610 and 612, and their outputs serve as inputs into the multiplexer of the next level (e.g., multiplexer 608). For each multiplexer, the comparison value represents the midpoint of the set of input transfer values into the leaf nodes under it. If the set of input transfer values have an even number of members, the next larger transfer value is chosen, as mentioned before.

Thus, for multiplexer 612, which is also a leaf node, the comparison value is 2, which is the next larger transfer value from the actual midpoint between input transfer values 1 and 2. For multiplexer 610, the comparison value is 8; for multiplexer 614, the comparison value is 32, and for multiplexer 602, the comparison value is 128.

For multiplexer 604, the midpoint of the set of input transfer values inputted into the leaf nodes under it (e.g., input transfer values 16, 32, 64, and 128) falls between transfer values 32 and 64. Thus, the comparison value is the next larger transfer value, or 64. For multiplexer 608, the midpoint of the set of input transfer values inputted into the leaf nodes under it (e.g., input transfer values 1, 2, 4, and 8) falls between transfer values 2 and 4. Thus, the comparison value is the next larger transfer value, or 4.

For multiplexer 606, the midpoint of the set of input transfer values inputted into the leaf nodes under it (e.g., input transfer values 1, 2, 4, 8, 16, 32, 64, and 128) falls between transfer values 8 and 16. Thus, the comparison value is the next larger transfer value, or 16.

With the gates properly programmed with respective comparison values, the comparison may be made very rapidly by simultaneously the value to be compared (X) against the respective comparison values for the multiplexers and applying the comparison results simultaneously to the multiplexers. If there is 33 bytes to be transferred (X=33), the control signals of multiplexers 612, 610, 614, and 602 would be respectively true, true, true, and false. Thus, the values inputted to multiplexer 608 will be 2 and 8 at its (a) and (b) inputs, respectively. The values inputted into multiplexer 604 will be 32 and 64 at its (a) and (b) inputs, respectively.

Furthermore, the control signals to multiplexers 608 and 604 will be true and false, respectively. Thus, the values inputted into multiplexer 606 will be 8 and 32 at its (a) and (b) inputs, respectively. Furthermore, the control signal to multiplexer 606 will be true, causing the input value at input (b) to be selected, or 32. Thus, the tree outputs 32, which is the optimum transfer size for the initial transfer.

Applying the above mentioned rule of selecting the combination of HBURST and HSIZE that involves the fewest bursts for a data transfer of 32 bytes, FIG. 5 suggests that this transfer should be made with HBURST=4 and HSIZE=8. One byte remains (33 bytes–32 bytes) after the initial transfer.

The remaining byte is again processed through the binary multiplexer tree of FIG. 6, and the result is an optimal transfer size of 1 byte. Applying the above-mentioned rule of selecting the combination of HBURST and HSIZE that involves the fewest bursts for a data transfer of 1 byte, FIG. 5 suggests that this transfer should be made with HBURST=1 and HSIZE=1, which happens to be the only combination for a transfer of 1 byte. This combination is selected, and the remaining data is transferred. Zero byte remains to be transferred and thus the transfer is complete.

Advantages of the invention include optimizing the overall data transfer throughput of a SOC, and the ability to flexibly schedule the transfer of arbitrary data sizes from different applications.

Having disclosed exemplary embodiments and the best mode, modifications and variations may be made to the disclosed embodiments while remaining within the subject and spirit of the invention as defined by the following claims.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for facilitating transfer of data between a master block and a slave block through a bus, comprising:
   a) ascertaining a transfer size of said data;
   b) designating a first possible transfer size in a set of possible transfer sizes a chosen transfer size, said set of possible transfer sizes including possible transfer sizes ranging from $2^0$ to $2^n$, where $2^n$ at least equals to the largest transfer size desired between said master block and said slave block, said first possible transfer size presenting the largest possible transfer size in said set of possible transfer sizes that is less than or equal to said transfer size;
   c) transferring a first data portion of said data from said master block to said slave block, said first data portion having a size that is equal to said chosen transfer size;
   d) if said chosen transfer size is less than said transfer size, setting said transfer size to be equal to said transfer size less said chosen transfer size and repeating steps b) through d).

2. The method of claim 1 wherein a combination of burst size and number of bursts involved in said transferring said first data portion is selected in a manner that minimizes a number of bursts required to accomplish said transferring said first data portion.

3. The method of claim 2 wherein said chosen transfer size is selected using a bisection optimization technique.

4. The method of claim 3 wherein said bisection optimization technique includes:

comparing said transfer size of said data with a middle possible transfer size in said set of possible transfer sizes, said possible transfer sizes in said set of possible transfer sizes being arranged in order by size, said middle possible transfer size representing a smallest possible transfer size of said possible transfer sizes that is equal to or larger than said transfer size of said data.

5. The method of claim 2 wherein said chosen transfer size is selected using a binary multiplexer tree.

6. The method of claim 5 wherein said binary multiplexer tree includes a plurality of multiplexers disposed as nodes in a binary tree arrangement, leaf nodes of said binary multiplexer tree being arranged to receive as inputs said possible transfer sizes, a root node of said binary multiplexer tree being arranged to output said chosen transfer size.

7. The method of claim 1 wherein said bus represents a bus in a SOC (system-on-chip) integrated circuit.

8. The method of claim 7 wherein said integrated circuit includes a microprocessor core.

9. The method of claim 7 wherein said bus conforms to AMBA (Advanced Microcontroller Bus Architecture).

10. An apparatus for ascertaining a chosen transfer size for facilitating data transfer of data between a master block and slave block through a computer bus, comprising a plurality of multiplexers disposed as nodes in a binary tree arrangement, leaf nodes of said binary multiplexer tree being configured to receive as inputs possible transfer sizes ranging from $2^0$ to $2^n$, where $2^n$ at least equals to the largest transfer size desired between said master block and said slave block, a root node of said binary multiplexer tree being configured to output said chosen transfer size, a leaf node of said leaf nodes being configured to receive two consecutive ones of said possible transfer sizes and configured to compare a value received at its control terminal against a larger one of said two consecutive ones, said leaf node being configured to output said larger one of said two consecutive ones if said value received is at least equal to said larger one of said two consecutive ones, said leaf node being configured to output a smaller one of said two consecutive ones if said value received is less then said larger one of said two consecutive ones, wherein said value is received at control terminals at each of said plurality of multiplexers, said value representing a size of said data.

11. The apparatus of claim 10 wherein said computer bus represents a computer bus in a SOC (system-on-chip) integrated circuit.

12. The apparatus of claim 11 wherein said integrated circuit includes a microprocessor core.

13. The apparatus of claim 12 wherein said computer bus conforms to AMBA (Advanced Microcontroller Bus Architecture).

* * * * *